United States Patent
Kleine-Horst et al.

(10) Patent No.: US 10,169,313 B2
(45) Date of Patent: Jan. 1, 2019

(54) IN-CONTEXT EDITING OF TEXT FOR ELEMENTS OF A GRAPHICAL USER INTERFACE

(71) Applicants: Jutta Kleine-Horst, Mannheim (DE); Markus Puchta, St. Leon-Rot (DE)

(72) Inventors: Jutta Kleine-Horst, Mannheim (DE); Markus Puchta, St. Leon-Rot (DE)

(73) Assignee: SAP SE, Walldorf (DE)

( * ) Notice: Subject to any disclaimer, the term of this patent is extended or adjusted under 35 U.S.C. 154(b) by 849 days.

(21) Appl. No.: 14/560,999

(22) Filed: Dec. 4, 2014

(65) Prior Publication Data
US 2016/0162166 A1 Jun. 9, 2016

(51) Int. Cl.
| | |
|---|---|
| *G06F 8/38* | (2018.01) |
| *G06F 17/24* | (2006.01) |
| *G06F 3/0484* | (2013.01) |
| *G06F 3/0482* | (2013.01) |
| *G06F 3/0481* | (2013.01) |
| *G06F 8/34* | (2018.01) |

(52) U.S. Cl.
CPC ............ *G06F 17/24* (2013.01); *G06F 3/0481* (2013.01); *G06F 3/0482* (2013.01); *G06F 3/04817* (2013.01); *G06F 8/34* (2013.01); *G06F 8/38* (2013.01)

(58) Field of Classification Search
CPC .................................................. G06F 11/3664
USPC ................................ 715/705, 711, 762, 763
See application file for complete search history.

(56) References Cited

U.S. PATENT DOCUMENTS

| | | | | |
|---|---|---|---|---|
| 7,685,519 | B1 * | 3/2010 | Duncan ................. | G06F 9/4446 715/705 |
| 9,594,731 | B2 * | 3/2017 | Zarzar ................. | G06F 17/2247 |
| 2002/0069204 | A1 * | 6/2002 | Kahn ....................... | G06F 17/24 |
| 2005/0028107 | A1 * | 2/2005 | Gomes ................ | G06F 11/3664 715/762 |
| 2005/0283726 | A1 * | 12/2005 | Lunati ................... | G06F 17/273 715/257 |
| 2011/0119605 | A1 * | 5/2011 | Jayadevan ................ | G06F 8/38 715/763 |

(Continued)

OTHER PUBLICATIONS

Alchemy Software Development Ltd., "About Toolbars," downloaded from the World Wide Web, 3 pp. (downloaded on Dec. 4, 2014—document not dated).

(Continued)

*Primary Examiner* — Andrew L Tank
(74) *Attorney, Agent, or Firm* — Klarquist Sparkman, LLP

(57) ABSTRACT

Innovations in the area of tools for editing text of elements of a graphical user interface ("GUI") are presented herein. For example, an editing tool manages a shell area and an editing area. In the shell area, the editing tool renders a GUI that is operable by a user. The GUI has multiple elements. In the editing area, the editing tool renders editable text associated with a GUI element. While the text is shown in the editing area, the GUI element can be concurrently highlighted in the shell area. The editing tool receives user input from the user and, based at least in part on the user input, updates (e.g., for revision, translation) at least some of the text associated with the GUI element. By showing the context of the GUI element while text for it is being edited, the editing tool facilitates language editing with fewer errors and inconsistencies.

20 Claims, 13 Drawing Sheets

(56) References Cited

U.S. PATENT DOCUMENTS

2016/0147746 A1* 5/2016 Park ................... G06F 17/289
704/7

OTHER PUBLICATIONS

Alchemy Software Development Ltd., "About WYSIWYG Editors," downloaded from the World Wide Web, 41 pp. (downloaded on Dec. 4, 2014—document not dated).
Alchemy Software Development Ltd., "Alchemy Catalyst 10," downloaded from the World Wide Web, 12 pp. (downloaded on Dec. 4, 2014—document not dated).
Alchemy Software Development Ltd., "Alchemy Project Environment," downloaded from the World Wide Web, 3 pp. (downloaded on Dec. 4, 2014—document not dated).
Alchemy Software Development Ltd., "Overview: Reference Browser," downloaded from the World Wide Web, 4 pp. (downloaded on Dec. 4, 2014—document not dated).
Alchemy Software Development Ltd., "Visual Inheritance," downloaded from the World Wide Web, 2 pp. (downloaded on Dec. 4, 2014—document not dated).
OmegaT, "Introducing OmegaT," downloaded from the World Wide Web, 1 p. (downloaded on Dec. 4, 2014—document not dated).
SAP Basics, "Basis," downloaded from the World Wide Web, 5 pp. (downloaded on Dec. 3, 2014—document not dated).
SAP SE, "Administrative Functions in Transaction LXE_MASTER," Setting Up and Coordinating Translation, downloaded on the World Wide Web, 3 pp. (downloaded on Dec. 3, 2014—document not dated).
SAP SE, "Maintaining Text Elements," ABAP Workbench Tools, downloaded from the World Wide Web, 2 pp. (downloaded on Dec. 3, 2014—document not dated).
SAP SE, "Setting Up the Translation Environment," Setting Up and Coordinating Translation, downloaded from the World Wide Web, 2 pp. (downloaded on Dec. 3, 2014—document not dated).
SAP SE, "Translating Text Elements," ABAP Workbench Tools, downloaded from the World Wide Web, 2 pp. (downloaded on Dec. 3, 2014—document not dated).
SAP SE, "Translation Tools for Translators," downloaded from World Wide Web, 68 pp. (downloaded on Dec. 3, 2014—document not dated).
SAP SE, "Web Dynpro in the ABAP Workbench," downloaded from the World Wide Web, 2 pp. (downloaded on Dec. 3, 2014—document not dated).
SAP SE, "Web Dynpro Text Browser," downloaded from the World Wide Web, 2 pp. (downloaded on Dec. 3, 2014—document not dated).
SAP SE, "Web Dynpro Tools in the ABAP Workbench," downloaded from the World Wide Web, 2 pp. (downloaded on Dec. 3, 2014—document not dated).
SDL, "Freelance Translators—Accelerate Your Translation," 4 pp. (2014).
SDL, "SDL Passolo 2015," downloaded from the World Wide Web, 5 pp. (downloaded on Dec. 4, 2014—document not dated).
SDL, "SDL Trados," downloaded from the World Wide Web, 1 p. (downloaded on Dec. 3, 2014—document not dated).
SDL, "SDL Trados Studio," downloaded from the World Wide Web, 5 pp. (downloaded on Dec. 3, 2014—document not dated).
SDL, "Software Localization Made Easy," 5 pp. (2014).
SDL, "What is Software Localization," downloaded from the World Wide Web, 3 pp. (downloaded on Dec. 4, 2014—document not dated).
SDL, "What is Translation Memory," downloaded from the World Wide Web, 3 pp. (downloaded on Dec. 3, 2014—document not dated).
Smolej, "OmegaT 2.6—User's Guide," 124 pp. (2013).
Wikipedia, "GuiXT," downloaded from the World Wide Web, 2 pp. (document marked: last modified on Aug. 25, 2014).
Wikipedia, "Open Data Protocol," downloaded from the World Wide Web, 6 pp. (document marked: last modified Nov. 19, 2014).
Wikipedia, "SAPgui," downloaded from the World Wide Web, 4 pp. (document marked: last modified on Nov. 28, 2014).
Wordfast, LLC, "User Guide for Project Managers and Translators," 263 pp. (2014).
Wordfast, LLC, "User Manual," Version 6, 119 pp. (2011).
Wordfast, LLC, "Wordfast Pro," downloaded from the World Wide Web, 2 pp. (downloaded on Dec. 3, 2014—document not dated).
Wordfast, LLC, "Wordfast Server User Manual," Version 1.x, 63 pp. (2014).
Wordfast Wiki, "Wordfast Anywhere User Guide," downloaded from the World Wide Web, 8 pp. (document marked: last modified on Sep. 16, 2013).

* cited by examiner software 180 implementing innovations
for in-context editing of text for elements
of a graphical user interface

IN-CONTEXT EDITING OF TEXT FOR ELEMENTS OF A GRAPHICAL USER INTERFACE

BACKGROUND

In a computer system, a graphical user interface ("GUI") is an interface that allows a user to interact with the computer system through graphical controls, icons and other elements, which the user can manipulate to cause the computer system to perform operations. Common GUI elements include buttons, sliders, check boxes, scroll bars, and other controls, icons, menus, and text entry fields. GUI elements may have text descriptions (labels). GUI elements may also have other text associated with them, such as help text, explanations of the GUI elements, or tool tip text.

When a GUI is designed by a team, one or more team members may specify the overall layout and behavior of elements of the GUI. Such team member(s) may provide initial text for elements of the GUI. After the layout and behavior of the GUI are finalized, one or more other team members may edit (or provide) text labels used in the GUI as well as other, associated text that explains the significance of different GUI elements. The text labels and other text for the GUI elements may be stored as part of one or more resource files separate from the definition of the layout and behavior of the GUI elements.

This manner of GUI design facilitates internationalization and localization of software. Internationalization refers to the process of designing software so that it can be easily adapted to various languages and regions, without engineering changes. For example, when a GUI is developed, the overall layout and behavior of elements of the GUI can be defined in a language-independent manner, with separate definition of text associated with the GUI elements. Localization refers to the adaptation of software for a specific region or language by translating text and adding locale-specific components. Localization may be performed multiple times for different regions or languages. For some products, for example, text is translated into 20, 30, or more different languages.

In many cases, as part of the language editing process during development, testing, or localization (translation) of a GUI, a language editor has little or no context for terms or phrases being edited. The language editor may lack access to the GUI or otherwise lack knowledge of the layout and behavior of the GUI. For example, a translator may get a list of terms or phrases in one language, for translation to another language, without access to the GUI itself. This can be problematic when a term or phrase has different meanings depending on context (e.g., second as a unit of time versus second as a count or order). When editing documentation for a GUI, a language editor may similarly lack knowledge of the layout and behavior of the GUI.

In some cases, as part of the language editing process, a language editor may use a tool that can generate a static preview or screenshot of a GUI. Often, the static preview or screenshot only depicts a single GUI element, however, so the overall layout is not shown. Also, such a tool does not generate a complete, operable version of the GUI.

These factors can lead to inconsistencies and quality problems in the text associated with GUI elements. Such problems are exacerbated when translators or other language editors work apart from the main development team for a GUI, or otherwise have limited access or no access to the main development team. Addressing errors and quality problems in text may require time-consuming, extensive testing and reworking of the text associated with GUI elements.

SUMMARY

In summary, the detailed description presents innovations in the area of tools for editing text of elements of a graphical user interface ("GUI"). For example, an editing tool manages a shell area and an editing area. In the shell area, a GUI having multiple elements is operable by a user such as a translator or other language editor. Concurrently, in the editing area, the user can edit text for a GUI element. By showing the context of the GUI element while the GUI element is being edited, the editing tool facilitates translation and other language editing tasks with fewer errors and inconsistencies.

According to one aspect of the innovations described herein, an editing tool renders for display a shell area in which a GUI having multiple elements is operable by a user. The multiple GUI elements can include a button, a field label, a field, a table column, a help menu, a popup message, and/or another type of GUI element having text associated with the GUI element. The editing tool also renders for display an editing area in which text associated with a given element of the GUI, among the multiple elements of the GUI, is editable. While text associated with the given GUI element is shown in the editing area, the given GUI element can be concurrently highlighted in the shell area using an overlay of the GUI. The editing tool receives user input from the user and, based at least in part on the user input, updates (e.g., for revision, for translation, or for some other purpose) at least some of the text associated with the given element of the GUI. The updates in the editing area can be reflected in the shell area to show the updated text for the given GUI element.

Typically, the editing tool manages the editing area and the shell area. The editing tool can use messages to communicate status changes between the editing area and the shell area. In operation, selection of the given GUI element during operation of the GUI in the shell area can cause display, in the editing area, of the text associated with the given GUI element. Or, switching to the given GUI element from another GUI element (such as the previous GUI element or next GUI element among the multiple GUI elements) can cause display, in the editing area, of the text associated with the given GUI element.

The text associated with the given GUI element can include one or more text items that are displayed in the editing area. For example, the text item(s) include a tool tip, a description (label), and/or additional explanatory text. Multiple text items associated with the given GUI element can be concurrently displayed in the editing area. In the editing area, each of the text item(s) can be editable in a section for that text item. For example, for a text item, the editing area includes: (1) a first field that shows a current value of the text item; (2) a second field that is editable to provide a new value of the text item; and (3) a third field that shows a permissible length for the text item. Changes to the second field can be used for revision or translation of the text item. As another example, for a text item, the editing area can include a field that shows at least one previous value of the text item, so as to track changes to the text item.

In operation, an overlay for the GUI in the shell area can highlight any of the multiple elements of the GUI that have new or changed text. According to one approach to editing, only those GUI elements that have new or changed text are selectable for editing in the editing area. According to another approach to editing, any GUI element or other technical object associated with the GUI that has editable text is selectable for editing in the editing area, even if the other technical object has text that is not visible in the GUI.

According to another aspect of the innovations described herein, a computer system including a processor and memory implements an editing tool. The editing tool includes several modules. A first module of the editing tool is configured to manage a shell area in which a GUI is operable by a user. The GUI has multiple elements. A second module of the editing tool is in communication with the first module of the editing tool. The second module is configured to manage an editing area in which text associated with at least one of the multiple GUI elements is editable by the user. The second module is further configured to update the text associated with at least one of the multiple GUI elements. Text updates completed in the editing area can be reflected in the GUI in the shell area.

The editing tool can be configured to signal actions when managing communication between the shell area and the editing area. For example, the actions include one or more of: (1) a first action that causes, in response to selection of one of the multiple GUI elements in the shell area, loading and display in the editing area of text associated with the selected GUI element; (2) a second action that causes highlighting in the shell area, using an overlay of the GUI, of one of the multiple GUI elements; (3) a third action that causes switching, in terms of text in the editing area and/or highlighting in the shell area, using an overlay of the GUI, between two of the multiple GUI elements; and (4) a fourth action that causes, in response to receipt of user input from the user, changes in the shell area to the text associated with at least one of the multiple GUI elements. Alternatively, the editing tool signals other and/or additional actions when managing communication between the shell area and the editing area.

The editing tool can further include a third module in communication with the first module and/or the second module. The third module can be configured to simulate error conditions and thereby cause display of error messages in the shell area. At least some of the error messages may have associated text that is editable within the editing area.

The innovations can be implemented as part of a method, as part of a computing system adapted to perform the method or as part of non-transitory computer-readable media storing computer-executable instructions for causing a computing system, when programmed thereby, to perform the method. The various innovations can be used in combination or separately. The foregoing and other objects, features, and advantages of the invention will become more apparent from the following detailed description, which proceeds with reference to the accompanying figures.

DETAILED DESCRIPTION

The detailed description presents innovations in the area of tools for editing text of elements of a graphical user interface ("GUI"). For example, an editing tool manages a shell area and an editing area. In the shell area, a GUI having multiple elements is operable by a user such as a translator or other language editor. Concurrently, in the editing area, the user can edit text for a GUI element. By showing the context of the GUI element while the GUI element is being edited, the editing tool facilitates translation and other language editing tasks with fewer errors and inconsistencies.

Various examples of language editing for text associated with elements of a GUI are described herein. The language editing can include translation of the text from one language to another language. Or, the language editing can include creation of text for descriptions, tool tips, help files, or other text items for one or more GUI elements during development of a GUI. Or, the language editing can include revision of text for such GUI element(s) during testing or at some other stage.

In the examples described herein, identical reference numbers in different figures indicate an identical component or module. Depending on context, a given component or module may accept a different type of information as input and/or produce a different type of information as output. More generally, various alternatives to the examples described herein are possible. For example, some of the methods described herein can be altered by changing the ordering of the method acts described, by splitting, repeating, or omitting certain method acts. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
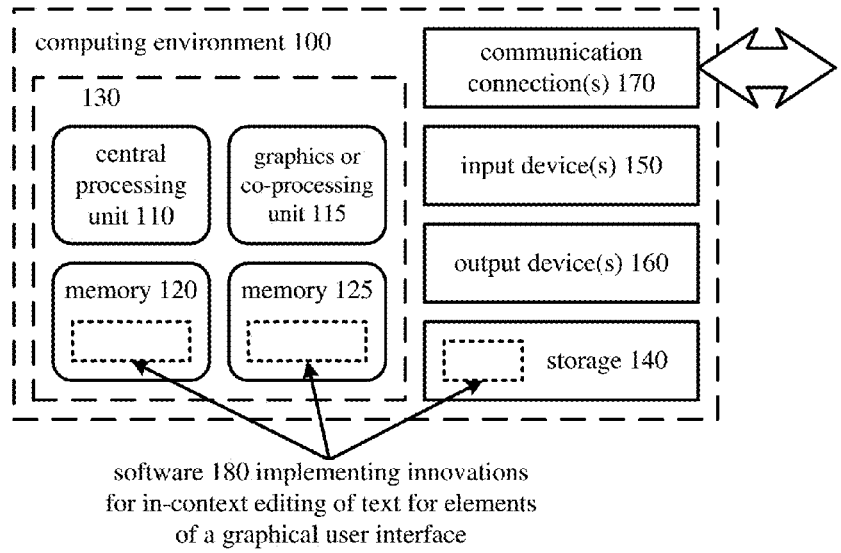
FIG. 1 is a diagram of an example computing system in which some described embodiments can be implemented.

FIG. 1 illustrates a generalized example of an example computing system (100) in which several of the described innovations may be implemented. The computing system (100) is not intended to suggest any limitation as to scope of use or functionality, as the innovations may be implemented in diverse computing systems, including special-purpose computing systems adapted for in-context editing of text for GUI elements.

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for in-context editing of text for GUI elements, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, OS software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for in-context editing of text for GUI elements.

The input device(s) (150) may be a touch input device such as a keyboard, mouse, pen, or trackball, a voice input device, a scanning device, touchscreen, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available non-transitory, tangible media that can be accessed within a computing environment. By way of example, and not limitation, with the computing system (100), non-transitory computer-readable media include memory (120, 125), storage (140), and combinations of any of the above.

The innovations can be described in the general context of computer-executable instructions, such as those included in modules, being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

The terms "system" and "device" are used interchangeably herein. Unless the context clearly indicates otherwise, neither term implies any limitation on a type of computing system or device. In general, a computing system or device can be local or distributed, and can include any combination of special-purpose hardware and/or hardware with software implementing the functionality described herein. The disclosed methods can be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "receive," "determine," and "update" to describe computer operations in a computing system. These terms are high-level abstractions for operations performed by a computer, and should not be confused with acts performed by a human being. The actual computer operations corresponding to these terms vary depending on implementation.

II. Example Cloud Computing Environments.

Figure 2:
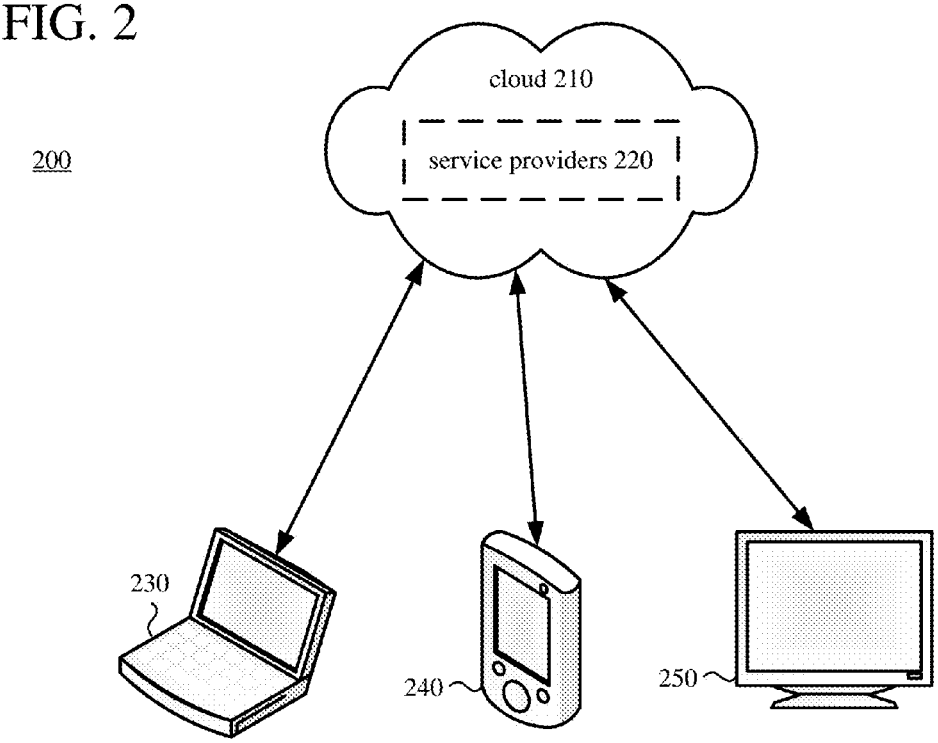
FIG. 2 is a diagram of an example cloud computing environment in which some described embodiments can be implemented.

FIG. 2 illustrates a generalized example of a cloud computing environment (200) in which several of the described innovations may be implemented. In the example environment (200), various types of services (e.g., computing services) are provided by a cloud (210). For example, the cloud (210) can comprise a collection of computing devices, which may be located centrally or distributed, that provide project management services for software development, distributed software development services or messaging services to various types of users and devices connected via a network such as the Internet. The computing devices of the cloud computing environment (200) can be used in different ways to accomplish computing tasks. For example, some tasks (e.g., processing user input to edit text, presenting a GUI, performing certain actions with applications) can be performed on local computing devices (e.g., connected devices 230, 240, 250), while other tasks (e.g., managing resource files for a project) can be performed in the cloud (210).

In the example cloud computing environment (200), the cloud (210) provides services for connected devices (230, 240, 250) with a variety of screen capabilities. A first connected device (230) represents a device with a computer screen (e.g., a mid-size screen). For example, the first connected device (230) can be a personal computer such as desktop computer, laptop computer, notebook computer, netbook computer, or the like. A second connected device (240) represents a device with a mobile device screen (e.g., a small size screen). For example, the second connected device (240) can be a mobile phone, smartphone, personal digital assistant, tablet computer, and the like. A third connected device (250) represents a device associated with a large screen. For example, the third connected device (250) can be a television screen (e.g., a smart television) or another device connected to a television (e.g., a set-top box or gaming console) or the like. Devices without screen capabilities also can be used in the example cloud computing environment (200). For example, the cloud (210) can provide services for one or more computers (e.g., server computers) without displays. The way a GUI is rendered can depend on the screen capabilities of a computing system that presents the GUI.

Services can be provided by the cloud (210) through service providers (220) or through other providers of online services (not depicted). Cloud services can be customized to the screen size, display capability, and/or touchscreen capability of a particular connected device (e.g., connected devices 230, 240, and/or 250). In the example cloud computing environment (200), the cloud (210) can provide services to manage resource files for a project and/or provide other services described herein, to the various connected devices (230, 240, and/or 250) using, at least in part, the service providers (220). In this case, the service providers (220) can provide a centralized solution for various cloud-based services. The service providers (220) can manage service subscriptions for users and/or devices (e.g., for the connected devices (230, 240, 250) and/or their respective users).

III. In-Context Editing of Text for GUI Elements.

When a GUI is designed or modified by a team, resource files for the GUI may be available at various stages during the development process. In some development approaches, development work for a GUI is performed in a development tool or environment. After the GUI is operable, resource files for the GUI are released for testing and language editing (such as completion of descriptions, tool tips, help files, etc. for GUI elements). Subsequently, resource files for the GUI are released for additional language editing such as translation. Typically, some resource files define the layout and behavior of elements of the GUI, while other resource files define text for the respective elements of the GUI. Using one or more of the innovations described herein, resource files that define the layout and behavior of GUI elements can be used to render an operable version of a GUI during the process of editing text for the GUI elements, thereby providing context for translation or other language editing activity.

In many examples presented herein, language editing is performed using an overlay mode similar to a simulation mode or demonstration mode for the GUI. The overlay mode is an example of a language editing mode. In the overlay mode, an operable GUI provides context for language editing. For example, for the overlay mode, text to be edited is displayed in an area adjacent the operable GUI. Concurrently, the text to be edited is directly displayed within the operable GUI. An overlay in the operable GUI emphasizes the GUI element(s) for which text is to be edited. For example, the overlay highlights the GUI element(s) with a different color area that is composited over or around the respective GUI element(s). The user can switch GUI element(s) to be edited by navigating within the operable GUI and/or by using controls for the adjacent area.

Depending on implementation, advantages of the in-context editing approaches described herein can include, but are not limited to, one or more of the following. First, editing of descriptions (labels), help information, tool tips, documentation, or other text associated with GUI elements is performed in context, with the text appearing directly in the GUI and, in some cases, being emphasized with an overlay in the GUI. Second, for a given GUI element, various text items associated with the GUI element (e.g., a label, help information, description, tool tip, and/or documentation) are presented together for purposes of editing, which simplifies the process of making changes to the different text items associated with that GUI element. Third, an operable GUI is rendered during language editing, so the user can evaluate the dynamic behavior of the GUI during editing (instead of editing terms or phrases in a list disconnected from the GUI, or making edits with reference to a static screenshot of the GUI or GUI element). Fourth, GUI elements with editable text can be presented sequentially, guiding the user through text for the new or changed GUI elements, or guiding the user through use case scenarios for the GUI. In this way, in-context editing can improve the quality of translation and other editing activities.

A. Generalized Interface for Example Editing Tool.

Figure 3:
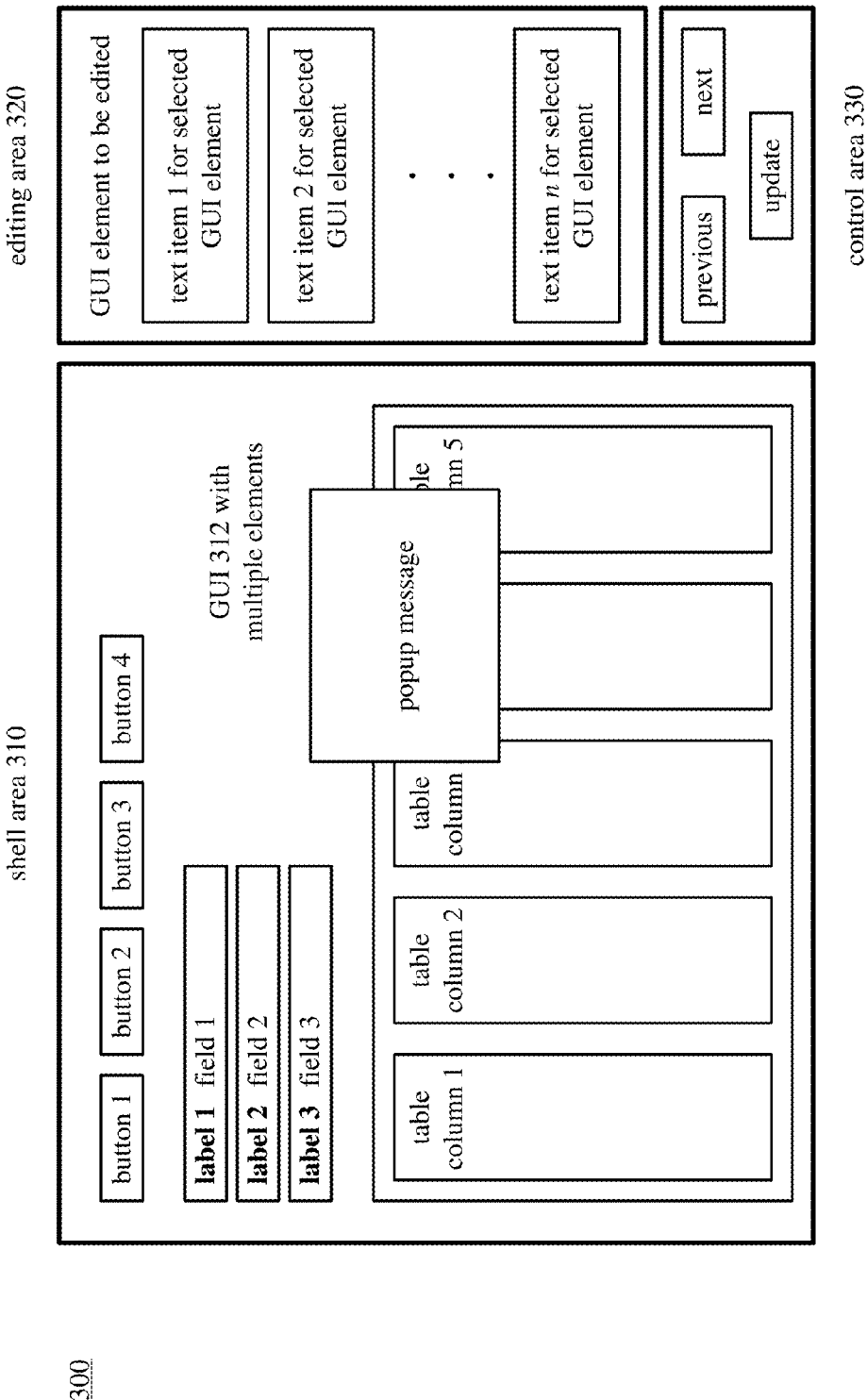
FIG. 3 is a diagram illustrating a generalized interface of an example editing tool.

FIG. 3 illustrates a generalized interface (300) of an example editing tool. The interface (300) includes a shell area (310) in which an operable GUI is rendered, an editing area (320) in which text for GUI elements is editable, and a control area (330).

In general, the shell area (310) presents an operable GUI that includes one or more GUI elements. For example, the GUI includes GUI elements such as buttons, sliders, check boxes, scroll bars, and other controls, icons, menus, field labels, and/or text entry fields. Alternatively, the GUI includes other and/or additional types of GUI elements. In FIG. 3, the shell area (310) presents a GUI (312) with multiple buttons, multiple field labels and related fields, multiple table columns of a database view, and a popup message.

GUI elements may have text descriptions (labels) as well as other associated text such as help text, explanations of the GUI elements, tool tip text, documentation or other types of text items. In many cases, the text for a GUI element is visible in the shell area (310) while a user edits the text using the editing tool, which provides context for the editing. For example, a text label for a button is shown in the button, a text label for a text entry field is shown next to the text entry field, a description for a check box is shown when a mouse cursor hovers over the check box, or a tool tip for a slider is shown when a user input event causes display of the tool tip.

In general, the editing area (320) presents one or more text items for a selected GUI element for editing by the user. The editing area (320) can be a side panel located adjacent to the shell area (e.g., left of the shell area (310), above the shell area (310), right of the shell area (310), or below the shell area (310)). Or, the editing area (320) and shell area (310) can be arranged in some other way in the interface (300). A text item can be a description/label, tool tip, other help information, documentation, additional explanation text or other type of text information. In FIG. 3, the editing area (320) includes multiple text items 1 . . . n for a selected GUI element. Aside from text items, the editing area (320) can show statistics about a GUI element or workload information. (In this context, workload information can indicate, e.g., the number of new or changed words/lines, as well as the number of translated or otherwise edited words/lines. Such information may help the language editor to plan his or her work.)

For live editing, as changes are made to a text item in the editing area (320), the changes are reflected in the shell area (310) in real time. Live editing can provide immediate feedback to the user with respect to whether edited text will fit in the selected GUI element when it is rendered. Alternatively, changes made to a text item in the editing area (320) are reflected in the shell area (310) when a user finished making edits to that text item (e.g., selects another text item for editing). Or, changes made to a text item in the editing area (320) are reflected in the shell area (310) when the changes are committed to storage or otherwise finalized.

Table 1 shows types of text items associated with different types of GUI elements and other technical objects in one framework. The types of GUI elements (e.g., button, field label, field, table column, help information, message) have text that is, or may become, visible in the GUI. Types of other technical objects (e.g., class, function group, function module, database table) have text that is not visible in the GUI. Most types of GUI elements/technical objects have an associated description (label). Some types of GUI elements have additional explanatory text, which may have a short length (short text), medium length (medium text), or long length (long text). Many types of GUI elements also have an associated tool tip. The framework is extensible (see TBD rows and columns), so new types of GUI elements/technical objects and/or new types of text items can be accommodated.

TABLE 1

Types of text items associated with types of GUI elements and technical objects.

| | description (label) | short text | medium text | long text | tool tip | TBD |
|---|---|---|---|---|---|---|
| button | used | — | — | — | used | |
| field | used | used | used | used | used | |
| field label | — | — | — | — | used | |
| table column | used | used | used | used | used | |
| help | used | — | — | — | — | |
| message | used | used | — | — | used | |
| class | used | — | — | — | — | |
| function group | used | — | — | — | — | |
| function module | used | — | — | — | — | |
| database table | used | — | — | — | — | |
| TBD | | | | | | |

The editing area (320) can show all text items for a selected GUI element, or the editing area (320) can show a subset of the text items for the selected GUI element. Showing all text items available for a selected GUI element can facilitate consistent editing (e.g., translation) for the respective text items for the selected GUI element. If the editing area (320) is too small to show the text item(s) for the selected GUI element, the editing area (320) can include a scroll bar or other control to allow the user to navigate to a different part of a text item or switch between text items. In this way, for example, detailed help information or documentation about a GUI element can be edited within the editing area (320) while the GUI element is emphasized in the shell area (310).

Figure 4:
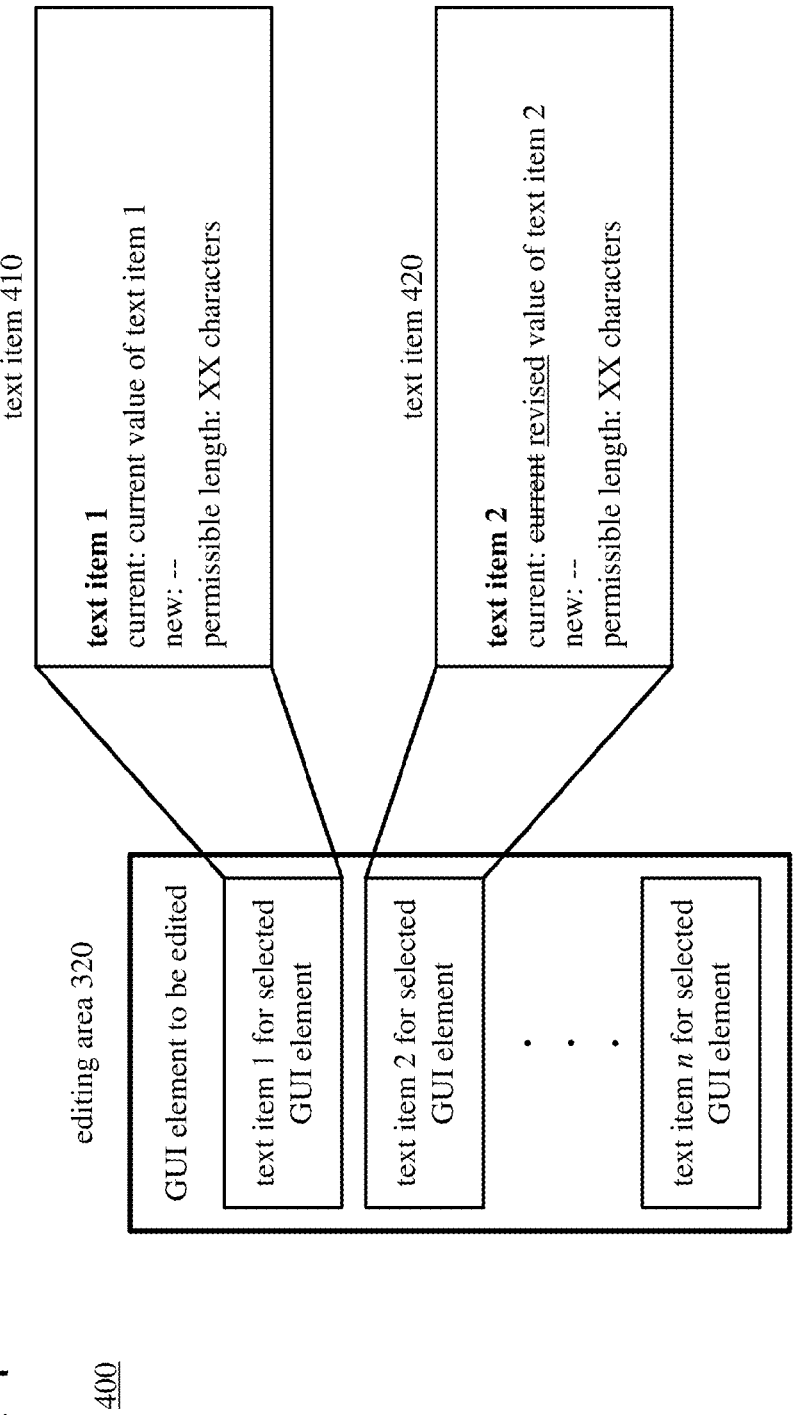
FIG. 4 is a diagram illustrating example text items in the editing area of the generalized interface of FIG. 3.

FIG. 4 shows example text items (410, 420) in the editing area (320) of the generalized interface (300). For a given text item (410, 420), the editing area (320) shows a header (title) for the text item, shows the current value of the text item, provides a field for entry of a new value of the text item, and shows the permissible length (e.g., maximum permitted length) of the text item. The permissible length can be expressed in characters or some other unit such as pixels. The permissible length can depend on form factor restrictions and/or other technical restrictions. (Accounting for the permissible length can be important for GUIs that are to be rendered on mobile devices with small screens.) The field for entry of the new value can be blank or include an initial value (e.g., based on the current value of the text item). For translation purposes, the current value of the text item shows the text item in a source language, and the entry field permits entry of a new value of the text item in a target language. In the context of translation, the field label for the current value can include an indicator of the source language (e.g., EN for English), and the field label for the entry field can include an indicator of the target language (e.g., FR for French). For examples, see FIGS. 7a-7e.

As shown in the second text item (420) of FIG. 4, when a text item has been changed during previous editing, the editing area (320) can show the text item with changes tracked. For example, new text is underlined, and deleted text is shown in brackets or with strikethrough formatting. This can help a user make corresponding changes to other, related text items or help the user update the value of a text item. For translation, for example, the tracked changes can be reflected in the current value of the text item for a source language, so that the value of the text item for the target language can more easily be updated. Emphasizing changes to the text of a text item in this way can facilitate consistent application of the changes to the text of other text items. Alternatively, information about a previous value of the text item is presented in some other way (e.g., a log of different, previous values of the text item). Or, the editing area (320) shows a single value for the text item and permits editing in-place within that value of the text item (e.g., to delete text, modify text, or add text).

Returning to FIG. 3, the selected GUI element for which text item(s) are presented in the editing area (320) can be emphasized in the shell area (310). For example, the selected GUI element in the shell area (310) is highlighted using a graphical overlay that is composited over the selected GUI element during rendering of the GUI (312). Or, the selected GUI element in the shell area (310) is graphically connected to the editing area (320). Or, the selected GUI element is emphasized in some other way in the shell area (310).

The control area (330) includes one or more controls for navigating through GUI elements having editable text and/or otherwise controlling the editing of text for elements of the GUI (312). For example, in FIG. 3, the controls include a "previous" button and a "next" button that the user actuates to switch to a previous GUI element or next GUI element, respectively, for the GUI (312). In FIG. 3, the control area (330) also includes an "update" button that the user actuates to commit any changes made to text items of the selected GUI element. Typically, committing the changes involves saving the changes to one or more resource files that include the text items. Alternatively, the control area (330) includes buttons for other and/or additional actions, or some other type(s) of controls. Instead of having a separate control area (330), the controls for text editing can be included in the editing area (320). In any case, with the controls, a user can tab through all of the GUI elements that have editable text (as well as other, related technical objects that have editable text that is not visible), one after the other, to edit the text or check the text for consistency. As the user tabs through GUI elements having editable text, the currently selected GUI element can be emphasized in the shell area (310).

Figure 5:
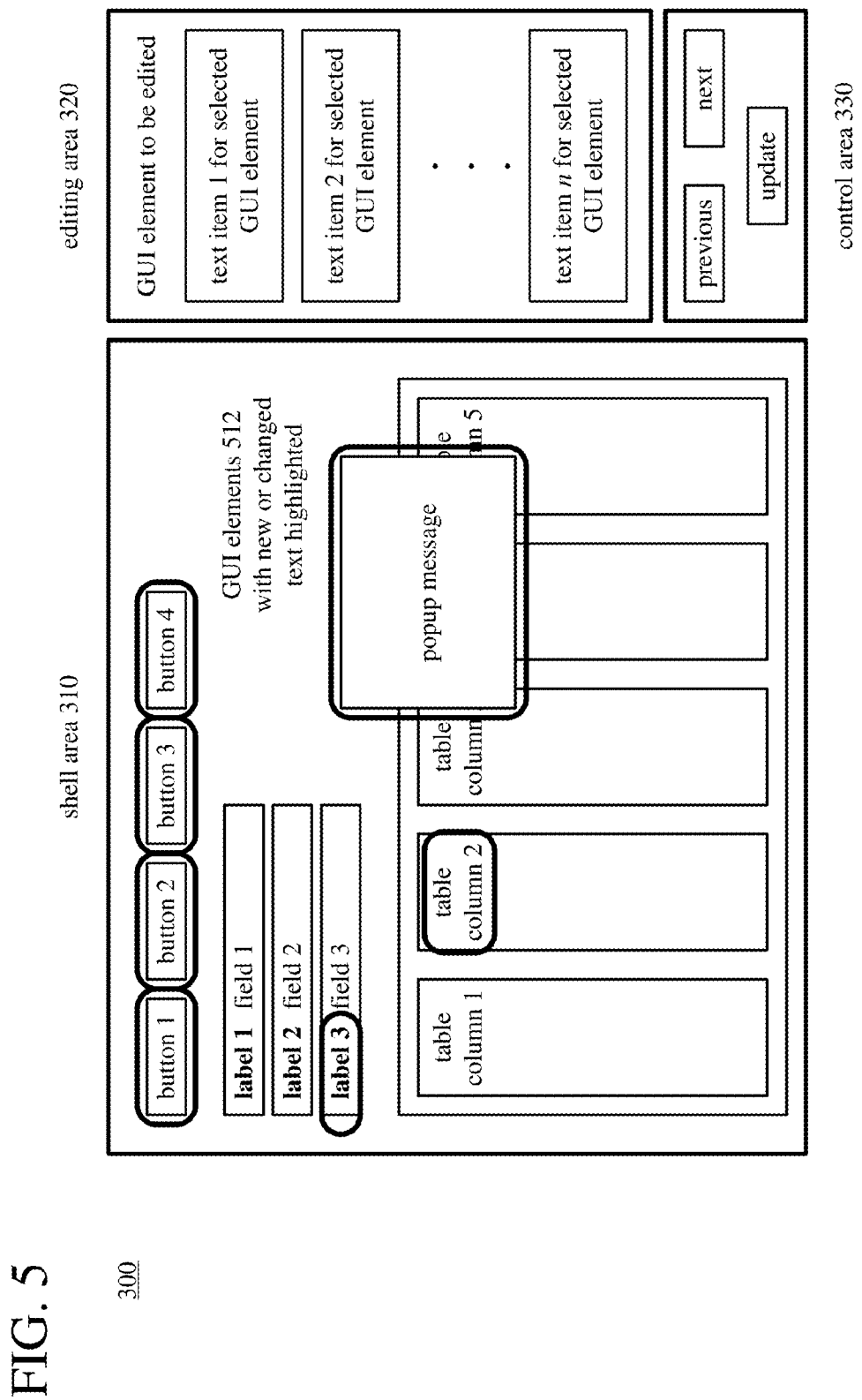
FIG. 5 is a diagram illustrating highlighting of GUI elements with new or changed text in the generalized interface of FIG. 3.

A setting of the editing tool can limit navigation to GUI elements having new or changed text. In this case, a user can tab through any of the GUI elements having new or changed text, one after the other, to edit the text or check the new/changed text for consistency. FIG. 5 illustrates highlighting of GUI elements (512) with new or changed text in the generalized interface (300). For translation, for example, the shell area (310) can emphasize GUI elements (512) with new or changed text that needs translation from a source language to a target language.

B. Example Software Architecture for In-Context Editing of Text for Elements of a GUI.

Figure 6:
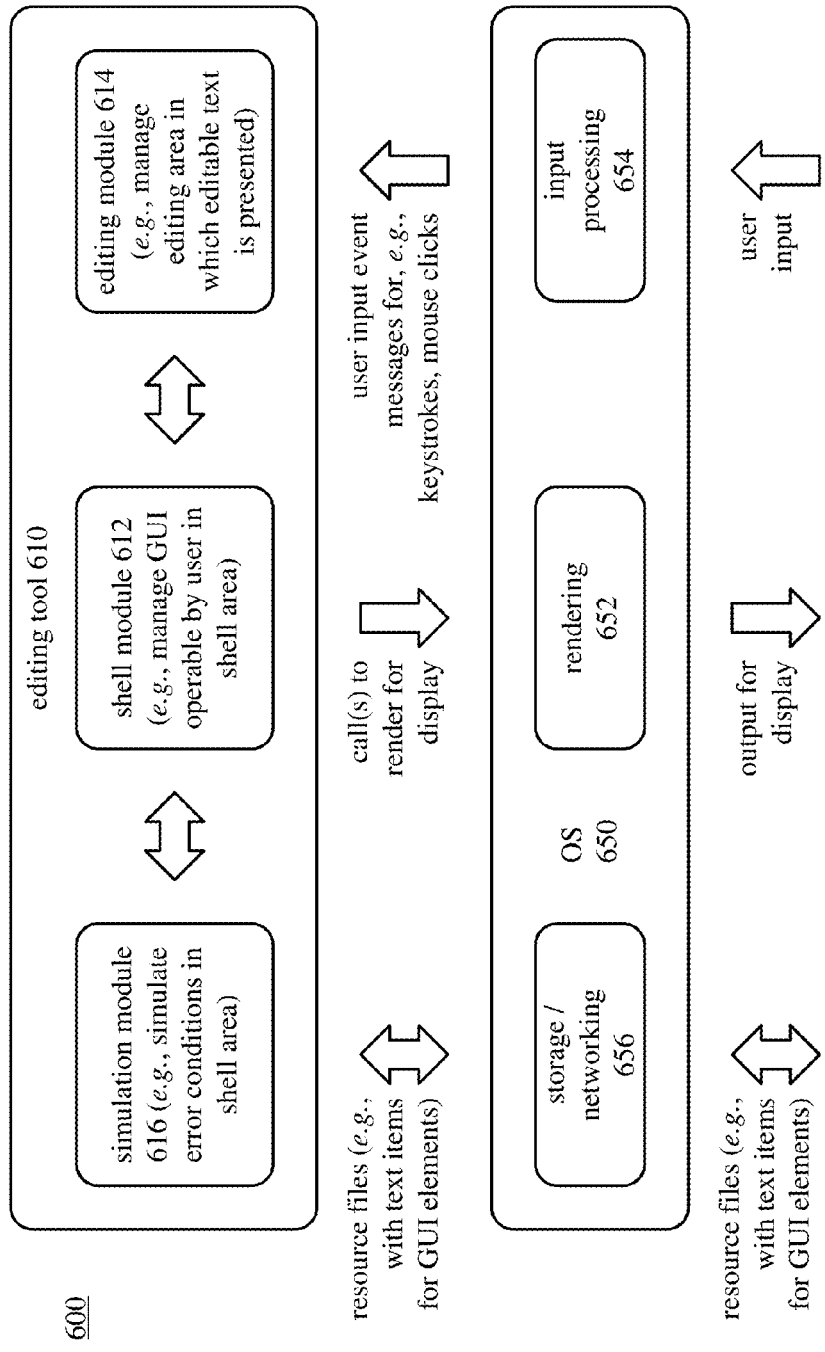
FIG. 6 is a block diagram illustrating an example software architecture in which an editing tool facilitates in-context editing of text of elements of a GUI.

FIG. 6 shows an example software architecture (600) for an editing tool (610) that facilitates in-context editing of text for elements of a GUI. A computing system (e.g., tablet computer, personal computer, or other computing system) can execute software organized according to the architecture (600) to edit text for GUI elements. The architecture (600) includes an OS (650) and an editing tool (610) that uses services of the OS (650). The editing tool (610) includes a shell module (612), editing module (614), and simulation module (616), which exchange messages within the editing tool (610).

Overall, the shell module (612) is configured to manage a shell area of the interface of the editing tool (610). In the shell area, a GUI is operable by a user. The shell module (612) manages the GUI using a language editing mode (e.g., an overlay mode) similar to a simulation mode or demonstration mode. In the language editing mode, the editing tool (610) uses resource files for the GUI to render the GUI in the shell area. The GUI in the shell area is operable—it can be operated by the user—even if data normally presented by the GUI is not available (e.g., because a backend module for an application or other software is offline). In this way, the user can see how the GUI behaves, even if the user cannot actually use the application or other software associated with the GUI to accomplish normal tasks for the application or other software. Depending on implementation, the language editing mode of the editing tool (610) can work with a GUI developed using a standardized technology (e.g., using HTML 5) and/or a GUI developed using a proprietary technology (e.g., Web Dynpro or SAPGUI from SAP SE). In the language editing mode, an operable version of the GUI is embedded in the shell area of the editing tool (610). Alternatively, the editing tool (610) can present a full-featured version of an application or other software in the shell area, including a GUI operable by the user.

The shell module (612) retrieves resource files that define the layout and behavior of elements of the GUI. The shell module (612) also retrieves resource files that include text items for the GUI elements, respectively. For example, the shell module (612) requests the resource files (including text items) using a storage or networking module (656) of the OS (650). A remote server, remote database, or local database stores the resource files, which are returned to the shell module (612). Resource files for text items and resource files defining the layout and behavior of GUI elements can be stored at the same server or database, or at different servers or databases.

In the language editing mode, GUI elements with new or changed text can be emphasized in the shell area managed by the shell module (612). Or, a currently selected GUI element whose text is editable can be emphasized in the shell area. Or, GUI elements with new or changed text can be emphasized in one way in the shell area, while a currently selected GUI element whose text is editable can be emphasized in another way in the shell area. Through one or more calls to a rendering module (652) of the OS (650), a GUI element can be emphasized using an overlay. For example, the overlay highlights the GUI element with a different color area that is composited over or around the GUI element. Or, the overlay graphically ties the GUI element to corresponding text in an editing area. Or, the overlay emphasizes the GUI element in some other way.

The shell module (612) reacts to various types of user input directed to GUI elements in the shell area. For example, when the user selects a GUI element in the shell area, the shell module (612) highlights or otherwise emphasizes the selected GUI element in the shell area. The shell module (612) also creates and sends a message to the editing module (614) to cause editable text for the selected GUI element to be shown in an editing area. More generally, the shell module (612) adjusts the GUI in the shell area responsive to user input according to the normal behavior of the GUI (e.g., to show actuation of a button or other control using an animation, to show the updated state of a check box or other control, to adjust the GUI responsive to a change in position of a slider or scroll bar, to show content of a menu when the menu is selected).

Overall, the editing module (614) is configured to manage an editing area of the interface of the editing tool (610). In the editing area, text associated with one or more elements of the GUI is editable by a user. The editing module (614) uses the resource files that define text items for the GUI elements, respectively. For example, the editing module (614) requests the resource files (including text items) using the storage or networking module (656) of the OS (650). A remote server, remote database, or local database stores the resource files, which are returned to the editing module (614). Or, the editing module (614) uses resource files previously returned to the shell module (612). The editing module (614) and shell module (612) use the same resource files for text items—the same underlying text is presented in the editing area and the shell area, although the timing of when edits are shown in the editing area and the shell area can vary depending on implementation.

In one framework, for a selected GUI element having a type, the editing module (614) determines the appropriate types of text items, considering the type of the selected GUI element. Different types of text items are presented in different sections of the editing area. Table 1 (above) shows examples of types of text items for different types of GUI elements in one framework. As shown in Table 1, a given type of text item can be used for different GUI elements. FIG. 4 illustrates one example of a general format for a type of text item: a header (title) line, the current value of the text item, a field for entry of a new value of the text item, and the permissible length of the text item.

The editing module (614) is further configured to update text associated with one or more elements of the GUI. The editing module (614) causes the editing area to display text associated with a selected GUI element. For example, the associated text includes a single text item (e.g., a description/label). Or, the associated text includes multiple related text items (e.g., a description/label, tool tip, other help information, and additional explanation text). Options for displaying text items are described above with reference to FIGS. 3 and 4. The editing module (614) manages editing of the text associated with selected GUI element. Text updates completed in the editing area can be reflected in the GUI in the shell area.

The simulation module (616) is configured to simulate error conditions in the shell area, so as to cause display of popup messages, other error messages or other text that may otherwise remain hidden. For example, the simulation module (616) causes display of a popup message or other text in the shell area, which in turn causes display of related text items for editing in the editing area. If the popup message or other text relates to a GUI element, the GUI element can be highlighted in the shell area. For example, if a popup message exists for an incorrectly entered value of a field, the field is highlighted in the shell area. This provides additional context for the user, who may infer how or why the popup message or other text appeared. Alternatively, when all elements of a GUI are reviewed, GUI elements and other technical objects associated with the GUI (even those non-visible text) are accessed by sequentially navigating through the elements and technical objects of the GUI (e.g., using the previous button or next button of a control area).

The editing module (614) is in communication with the shell module (612) and/or the simulation module (616). For example, the editing tool (610) uses messages between the shell module (612) and editing module (614). The messages indicate actions for the shell module (612) and/or editing module (614) to take. In general, some messages are sent from the shell module (612) to the editing module (614), while other messages are sent from the editing module (614) to the shell module (612). Still other messages are sent from the editing tool (610) to the shell module (612) and the editing module (614), e.g., when a control in the control area is actuated. One type of action can cause the editing module (614) to update the editing area (e.g., with different text items) when a GUI element is selected in the shell area. Another type of action can cause the shell module (612) to update the shell area (e.g., emphasizing a GUI element) and cause the editing module (614) to update the editing area when the GUI element is navigated to in the control area. Another type of action can cause the shell module (612) to update text of a GUI element in the shell area when the text is edited in the editing area. Table 2 shows types of actions defined for interactions between the shell module (612) and editing area (614) in one framework, in which GUI elements with new or changed text are edited.

TABLE 2

Types of actions defined for interactions between shell and editing modules.

| action | comment |
| --- | --- |
| display_information_in_editing_area | For a selected GUI element in the shell area, the defined sections of the editing area are to be loaded and filled with the corresponding information for text items. |
| highlight_UI_element | For a selected text item in the editing area, the corresponding GUI element is to be highlighted in the shell area. |
| provide_next_change | This action indicates navigation forward to a next GUI element with changed/new text. The editing area is to be updated with the relevant text item(s) for that GUI element. The corresponding GUI element in the shell area is to be highlighted. |
| provide_previous_change | This action indicates navigation back to a previous GUI element with changed/new text. The editing area is to be updated with the relevant text item(s) for that GUI element. The corresponding GUI element in the shell area is to be highlighted. |
| update_information_in_shell_area | For a selected text item in the editing area, edits to the text of the text item are to be shown in the corresponding GUI element in the shell area. |

The editing tool (610) can interact with a GUI development tool through one or more interfaces implemented by the GUI development tool. For example, a GUI development tool provides language editing connector classes that implement two interfaces. The first interface includes one or more methods that the editing tool (610) can call to request and receive a list of user interface objects (for GUI elements of a GUI) and corresponding types of text items. The second interface includes one or more methods that the editing tool (610) can call to request and receive text for instances of the respective text item(s) for a user interface object such as a GUI element, along with information about previous values for the text item(s), tracked changes, etc., where applicable. Thus, for example, when a user selects a GUI element for text editing, the editing tool (610) calls a method of the first interface to request and receive text items associated with the selected GUI element. Then, the editing tool (610) calls a method of the second interface to request and receive actual text information for those text items, which is rendered in the editing area.

The interfaces implemented by the language editing connector classes can be accessed through local procedure calls, where the GUI development tool and editing tool (610) are part of the same computer system. The interfaces are also useful in scenarios that include distributed editing. In particular, the interfaces implemented by the language editing connector classes can be accessed through remote procedure calls or another remote access mechanism, if the GUI development tool and editing tool (610) are part of different computer systems (e.g., for a software developer and external translator, respectively). For example, resources files for a GUI can be stored on a server managed by a software development team, but made available to a remote, external translation team through the interfaces. Alternatively, interfaces between the editing tool (610) and GUI development tool are implemented in some other way.

In FIG. 6, the OS (650) includes components for rendering (e.g., rendering visual output to a display), components for networking and storage, and components for input processing. Other components of the OS (650) are not shown. In general, the OS (650) manages user input functions, output functions, storage access functions, network communication functions, and other functions for the computer system. The OS (650) provides access to such functions to the editing tool (610).

A user generates user input that affects editing of text for GUI elements (e.g., to revise or translate text, to select a GUI element for language editing, or to switch between GUI elements for language editing). The user input can be tactile input such as touchscreen input, mouse input, button presses or keystrokes, or it can be voice input. In an input processing module (654), the OS (650) includes functionality for recognizing keystrokes, recognizing taps, gestures, or other input to a touchscreen, recognizing commands from voice input or button input, and creating messages that can be used by the editing tool (610). The editing tool (610) listens for user input event messages from the OS (650). The user input event messages can indicate keystroke input, mouse input, a gesture on a touchscreen, a tap on the touchscreen, or another user input event (e.g., from voice input, directional buttons, trackball input). The editing tool (610) can respond to the user input event messages as described elsewhere. In doing so, the editing tool (610) can make one or more calls to the OS (650), requesting that the OS (650) retrieve resource files for GUI elements from a server or storage, or render a shell area, editing area, and/or control area of the editing tool (610) for display.

The rendering module (652) of the OS (650) produces an image (or surface) based on an object instance or other run-time representation of the shell area, editing area, and/or control area of the editing tool (610). The surface is used to update the screen of a display device. When elements of the GUI in the shell area are structured as a hierarchy, the rendering module (652) can traverse the hierarchy, compositing GUI elements of the hierarchy from back to front onto the surface to be displayed. Similarly, elements of the editing area or control area can be composited by the rendering module (652). A hierarchy of elements is retained in memory, such that changes to an individual element can be reflected in the hierarchy and cause updates to the surface during subsequent rendering operations. The rendering module (652) can also provide output over a speaker or headphones. The exact operations performed as part of the rendering depend on implementation.

As requested by the editing tool (610), the storage/networking module (656) of the OS (650) requests resource files (including text items) from a remote server, remote database, or local database, which stores the resource files. The remote server, remote database, or local database returns the requested resource files to the storage/networking module (656), which returns them to the editing tool (610).

Alternatively, the OS (650) includes more or fewer modules. Or, the editing tool (610) includes more or fewer modules. A given module can be split into multiple modules, or different modules can be combined into a single module.

C. Examples of In-Context Editing of Text for GUI Elements.

FIGS. 7a-7e illustrate examples of editing of GUI elements in an example editing tool. In FIGS. 7a-7e, the interface (700) of the editing tool includes a shell area (710), editing area (720), and control area (730). The shell area (710) includes four buttons, three fields with labels, and five database columns. Other database columns can be viewed by actuating a chevron control at the bottom right of the shell area (710). The editing area (720) includes one or more text items for a selected GUI element. The control area (730) includes controls to navigate to a previous GUI element, navigate to a next GUI element, and commit updates to text item(s) for GUI element(s). In the example shown in FIGS. 7a-7e, text for certain GUI elements is translated from English (EN) to French (FR), as shown in the field labels in the sections for text items.

Figure 7A:
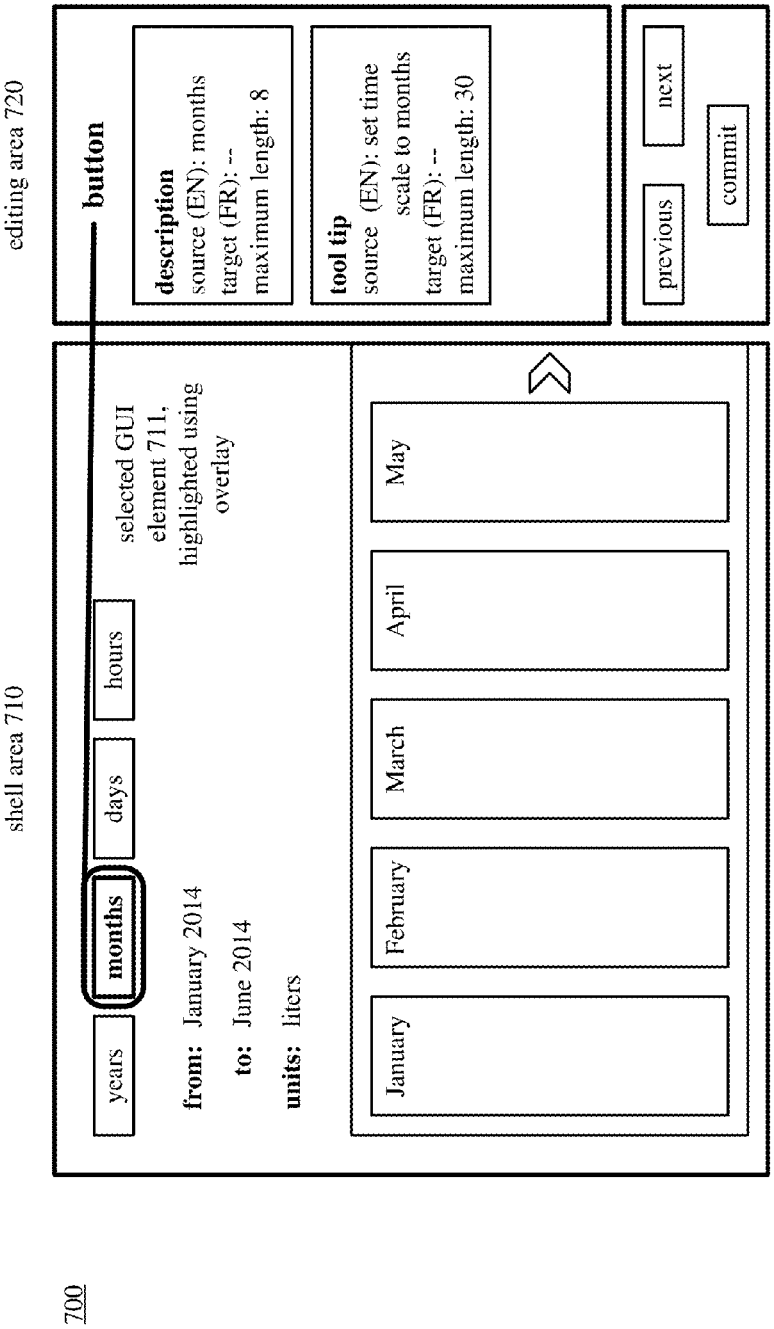
FIGS. 7a-7f are diagrams illustrating examples of editing of GUI elements in an example editing tool.

In FIG. 7a, a selected GUI element (711) is highlighted in the shell area (710) using an overlay. The selected GUI element (711) is surrounded by the overlay, which is composited over the selected GUI element (711). The overlay also graphically connects the selected GUI element (711) to the editing area (720). As illustrated in FIG. 7a, when the user selects the "months" button of the GUI in the shell area (710), the GUI in the shell area (710) is updated to include the overlay, and text for text items associated with the "months" button is presented in the editing area (720). The text items associated with the "months" button include a description (label) text item and a tool tip text item.

Figure 7B:
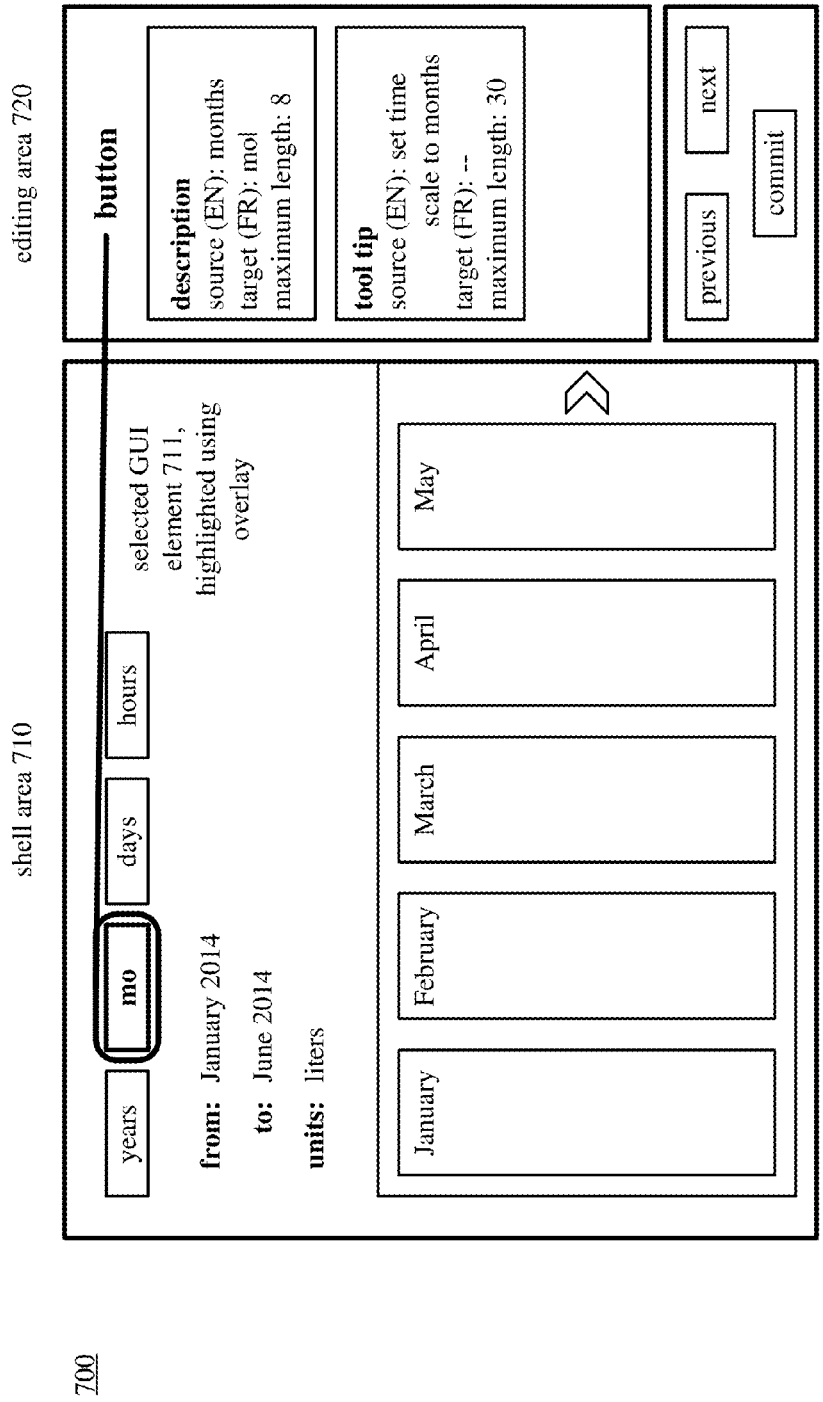

As illustrated in FIG. 7b, as the user edits the text associated with the description text item of the "months" button, the text of the "months" button in the shell area (710) is updated. This is an example of live editing in which real-time updates to the selected GUI element are made in the shell area (710) as a user edits text for the GUI element in the editing area (720). (As noted above, in alternative approaches, updates to the shell area (710) can be delayed until a user navigates to another GUI element or text item, or text changes are committed.)

Figure 7C:
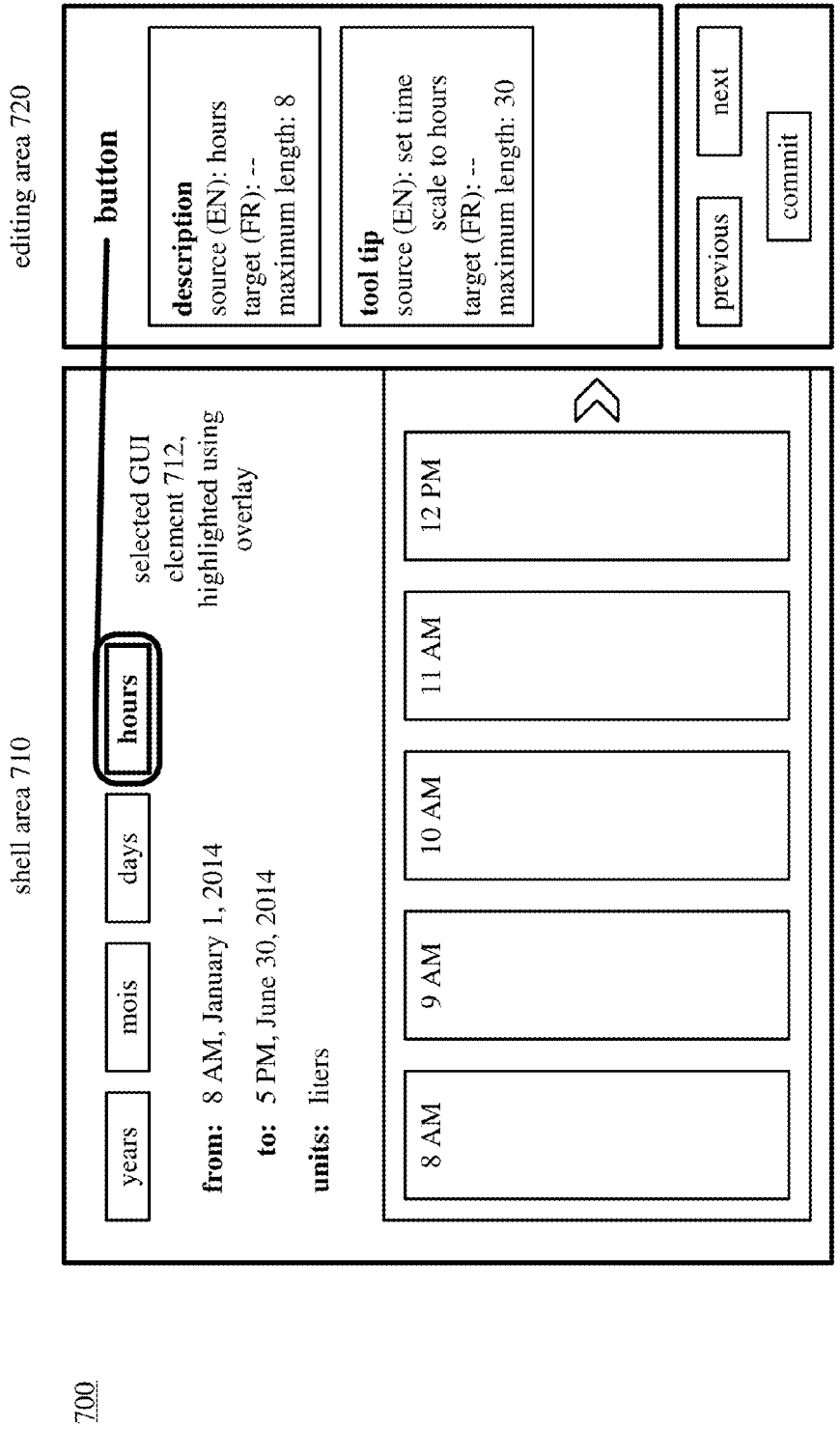

In FIG. 7c, the user has completed editing of the text for the "months" button and selected another GUI element for text editing. Specifically, the user has selected the "hours" button of the GUI in the shell area (710). When the user selects the "hours" button in the shell area, the GUI in the shell area (710) is updated to include an overlay that highlights the "hours" button, and text for text items associated with the "hours" button is presented in the editing area (720). Thus, in FIG. 7c, a new selected GUI element (712)—the "hours" button—is surrounded by an overlay, which is composited over the selected GUI element (712). The overlay also graphically connects the selected GUI element (712) to the editing area (720). The text items associated with the "hours" button include a description (label) text item and a tool tip text item. In FIG. 7c, other features of the GUI in the shell area (e.g., text in the fields and field labels, boldface of the text of the selected button, database columns) have also been updated, since the user selected a new button of the GUI in the shell area (710), which presents an operable version of the GUI.

Figure 7D:
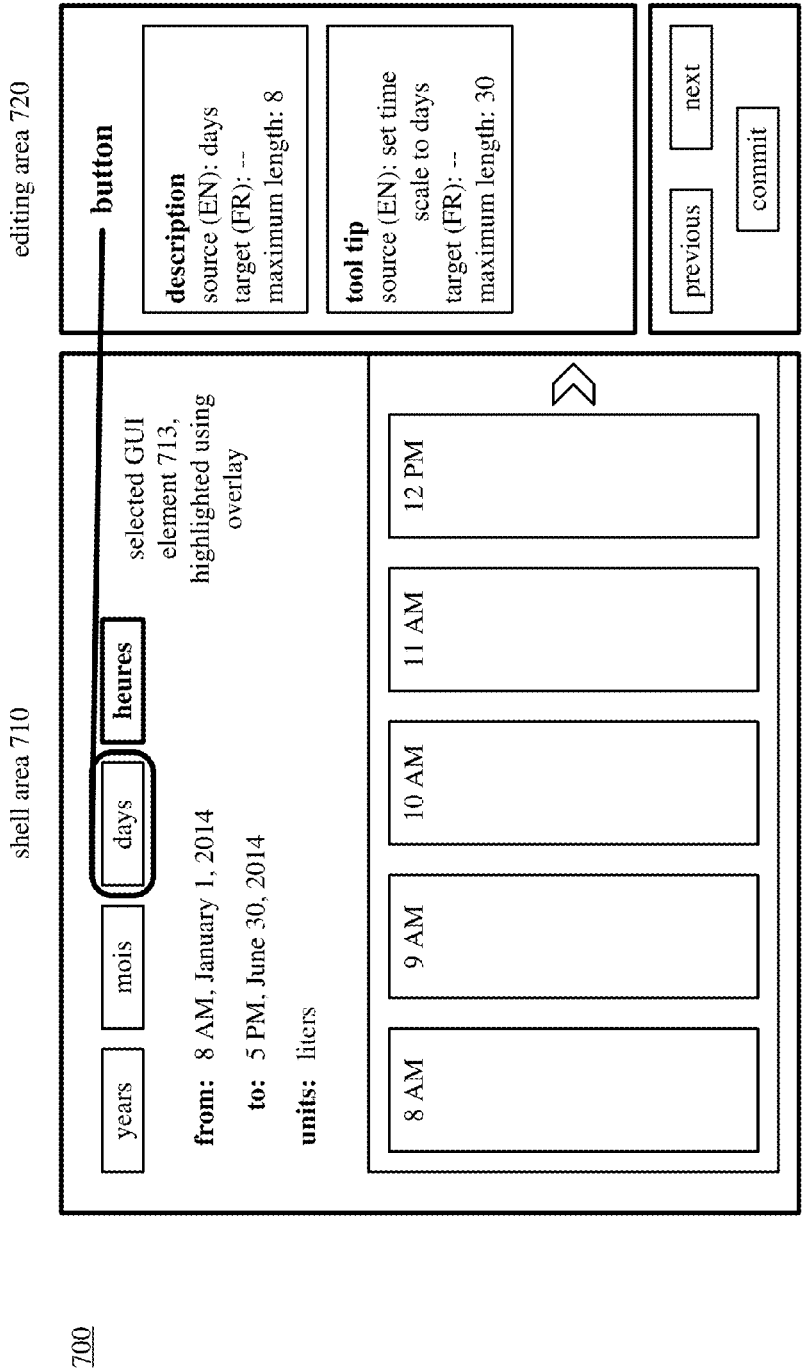

In FIG. 7d, the user has completed editing of the text for the "hours" button and navigated to another GUI element by actuating the "previous" button in the control area (730). When the user actuates the "previous" button in the control area (730), the GUI in the shell area (710) is updated to include an overlay that highlights the "days" button, and text for text items associated with the "days" button is presented in the editing area (720). Thus, in FIG. 7d, an overlay surrounds a new selected GUI element (713)—the "days" button—and graphically connects the selected GUI element (713) to the editing area (720). The text items associated with the "days" button include a description (label) text item and a tool tip text item. In FIG. 7d, other features of the GUI in the shell area (e.g., text in the fields and field labels, boldface of the text of the selected button, database columns) have not been updated, since the user navigated to the previous GUI element using a control in the control area (730).

Figure 7E:
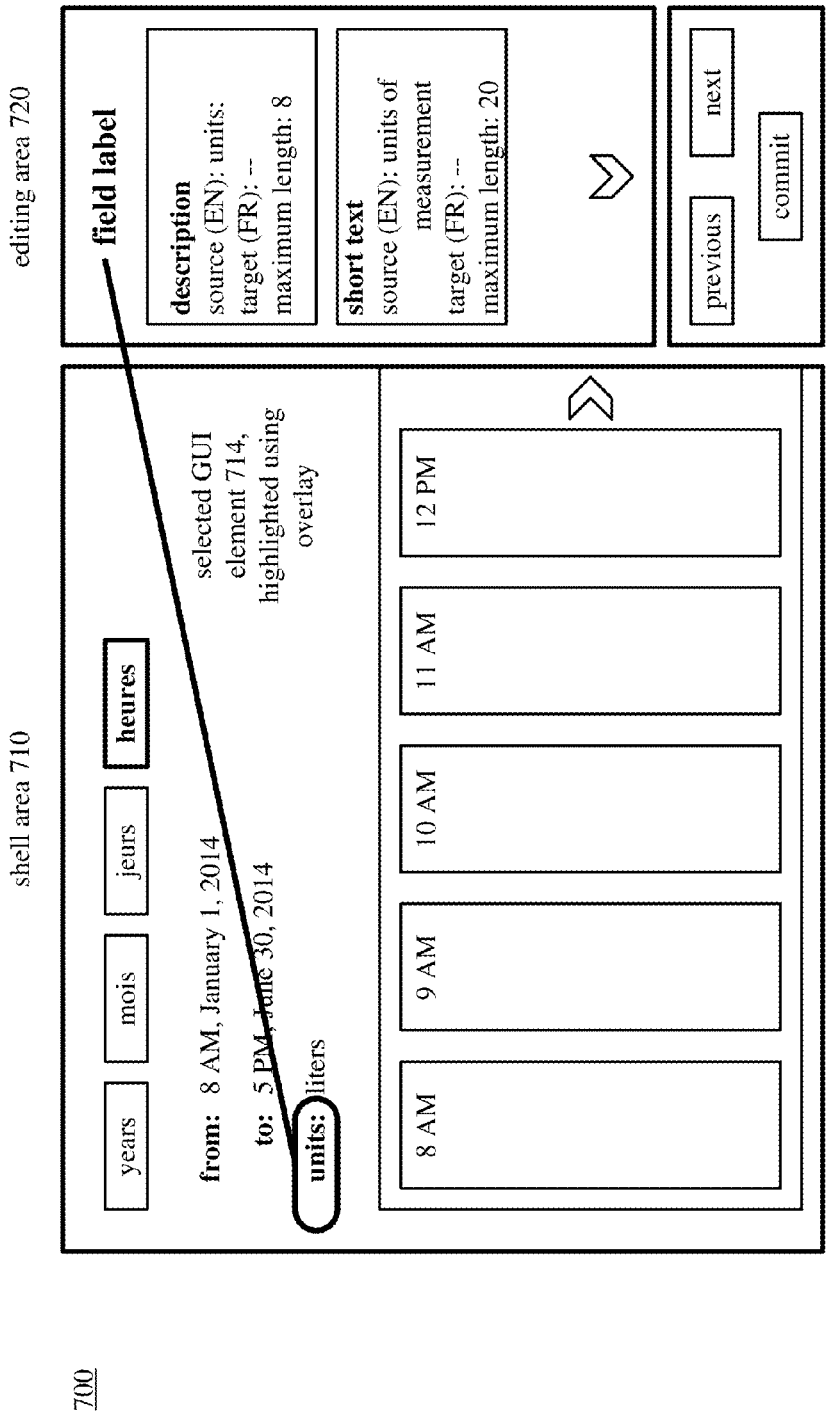

Finally, in FIG. 7e, the user has completed editing of the text for the "days" button and navigated to another GUI element by repeatedly actuating the "next" button in the control area (730). When the user repeatedly actuates the "next" button in the control area (730), the GUI in the shell area (710) is updated to include an overlay that highlights the "units" field label, and text for text items associated with the "units" field label is shown in the editing area (720). Thus, in FIG. 7e, an overlay surrounds a new selected GUI element (714)—the "units" field label—and graphically connects the selected GUI element (714) to the editing area (720). The text items associated with the "units" field label include a description (label) text item, a "short text" text item, a "medium text" text item, a "long text" text item, and a tool tip text item. Due to space limits in the editing area (720), only text for the description text item and "short text" text item is presented. The remaining text items can be viewed by actuating a chevron control at the bottom of the editing area (720).

Figure 7F:
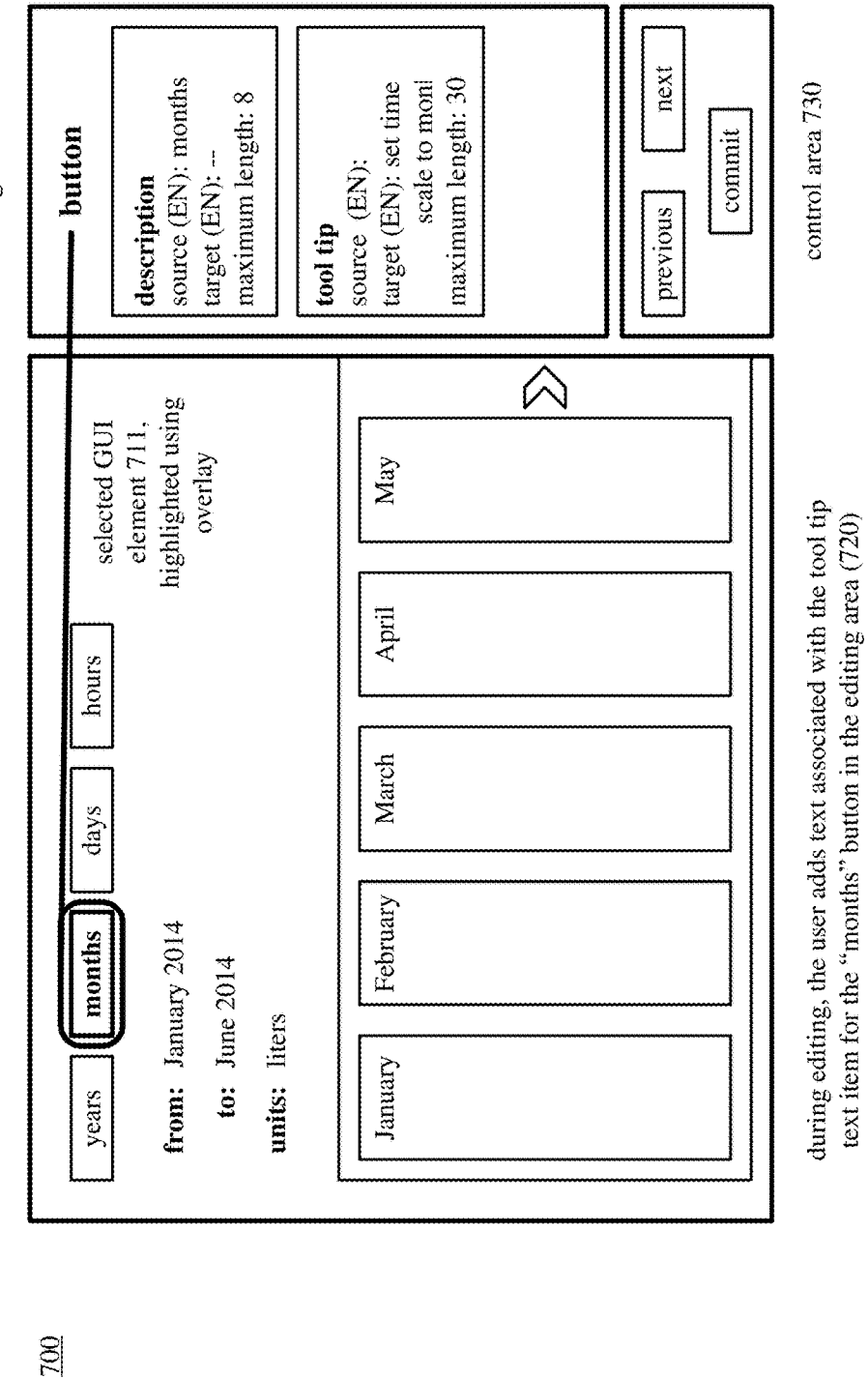

FIG. 7f illustrates an alternative example of editing of GUI elements in an example editing tool. The example in FIG. 7f involves language editing activity that precedes the translation activity in FIG. 7a-7e. For example, the language editing activity happens earlier in the development process for the GUI. For the language editing activity, the source and target language are the same (EN). Otherwise, the layout of the interface (700) shown in FIG. 7f is generally the same as the layout (700) shown in FIG. 7a.

In FIG. 7f, a selected GUI element (711)—the "months" button—is highlighted in the shell area (710) using an overlay. The overlay surrounds the selected GUI element (711) and graphically connects the selected GUI element (711) to the editing area (720). Text for text items associated with the "months" button is presented in the editing area (720). The text items include a description (label) text item and a tool tip text item. Initially, the tool tip text item for the "months" button has no text. In FIG. 7f, the user adds text associated with the tool tip text item in the editing area (720). The user can then commit the text changes to the tool tip text item for the "months" button.

D. Techniques for In-Context Editing of Text for GUI Elements.

Figure 8:
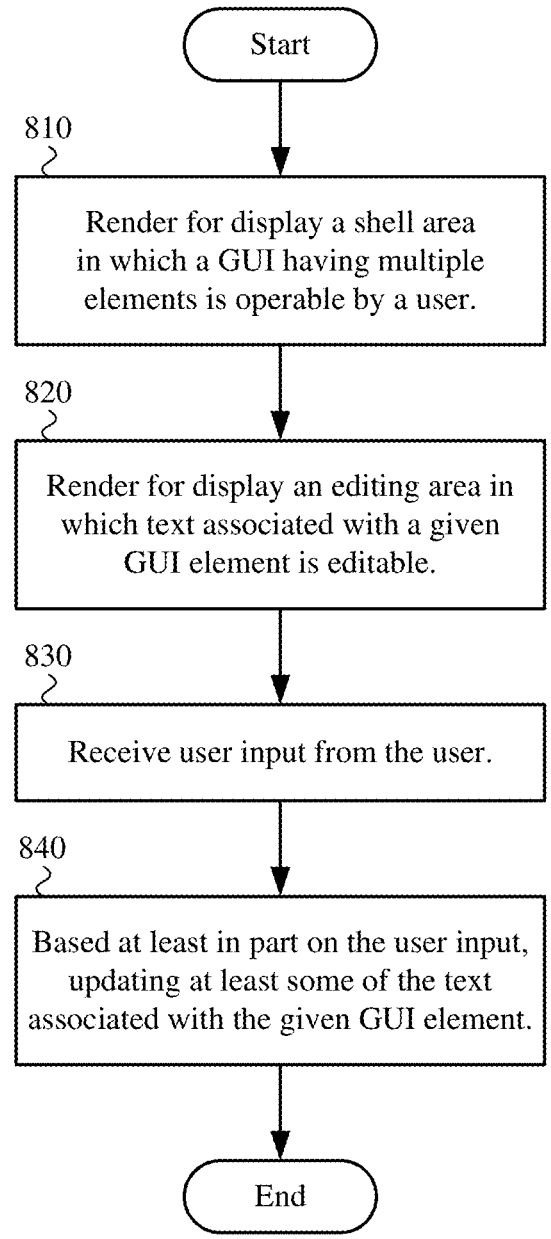
FIG. 8 is a flowchart illustrating a generalized technique for in-context editing of text of elements of a GUI.

FIG. 8 illustrates a generalized technique (800) for in-context editing of text of elements of a GUI. The technique (800) can be performed by an editing tool such as described with reference to FIG. 6, or by another editing tool.

To start, the editing tool renders (810) for display a shell area in which a GUI having multiple elements is operable by a user. For example, the editing tool renders (810) the GUI in a language editing mode similar to a simulation mode or demonstration mode. Examples of a language editing mode in an editing tool are described in section III.B. Alternatively, the editing tool renders (810) in the shell area a GUI for a full-featured version of an application or software. The multiple GUI elements can include a button, a field label, a field, a table column, a help menu, a popup message, and/or another type of GUI element having text associated with the GUI element.

The editing tool also renders (820) for display an editing area in which text associated with a given element of the GUI (among the multiple elements of the GUI) is editable. Text for other technical objects associated with the GUI (e.g., objects having non-visible text) can also be edited in the editing area.

The text associated with a given GUI element can include one or more text items that are displayed in the editing area. For example, the text item(s) include a tool tip, a description (label), and/or additional explanatory text. Multiple text items associated with the given GUI element can be concurrently displayed in the editing area. In the editing area, each of the text item(s) can be editable in a section for that text item. For example, for a text item, the editing area includes: (1) a first field that shows a current value of the text item; (2) a second field that is editable to provide a new value of the text item; and (3) a third field that shows a permissible length for the text item. Changes to the second field can be used for revision or translation of the text item. As another example, for a text item, the editing area can include a field that shows at least one previous value of the text item, so as to track changes to the text item.

In general, the editing tool manages the editing area and the shell area. In operation, selection of a given GUI element during operation of the GUI in the shell area can cause display, in the editing area, of the text associated with the given GUI element. Or, switching to the given GUI element from another GUI element (such as the previous GUI element or next GUI element among the multiple GUI elements) can cause display, in the editing area, of the text associated with the given GUI element. While text associated with a given GUI element is shown in the editing area, the given GUI element can be concurrently highlighted in the shell area using an overlay of the GUI, or otherwise emphasized in the shell area.

The editing tool can use messages to communicate status changes between the editing area and the shell area. For this purpose, the editing tool can be configured to signal actions when managing communication between the shell area and the editing area. For example, the actions include one or more of: (1) a first action that causes, in response to selection of one of the multiple GUI elements in the shell area, loading and display in the editing area of text associated with the selected GUI element; (2) a second action that causes highlighting in the shell area, using an overlay of the GUI, of one of the multiple GUI elements; (3) a third action that causes switching, in terms of text in the editing area and/or highlighting in the shell area, using an overlay of the GUI, between two of the multiple GUI elements; and (4) a fourth action that causes, in response to receipt of user input from the user, changes in the shell area to the text associated with at least one of the multiple GUI elements. Alternatively, the editing tool signals other and/or additional actions when managing communication between the shell area and the editing area.

Returning to FIG. 8, the editing tool receives (830) user input from the user. Based at least in part on the user input, the editing tool updates (840) (e.g., for revision, for translation, or for some other purpose) at least some of the text associated with the given element of the GUI. The updates completed in the editing area can be reflected in the shell area to show the updated text for the given GUI element.

The editing tool can repeat the process shown in FIG. 8 for one or more other elements of the GUI. For example, in operation, an overlay for the GUI in the shell area can highlight any of the multiple elements of the GUI that have new or changed text. According to one approach to editing, only those GUI elements that have new or changed text are selectable for editing in the editing area. According to another approach to editing, any GUI element or other technical object related to the GUI that has editable text is selectable for editing in the editing area, even if the other technical object has text that is not visible in the GUI.

Figure 9:
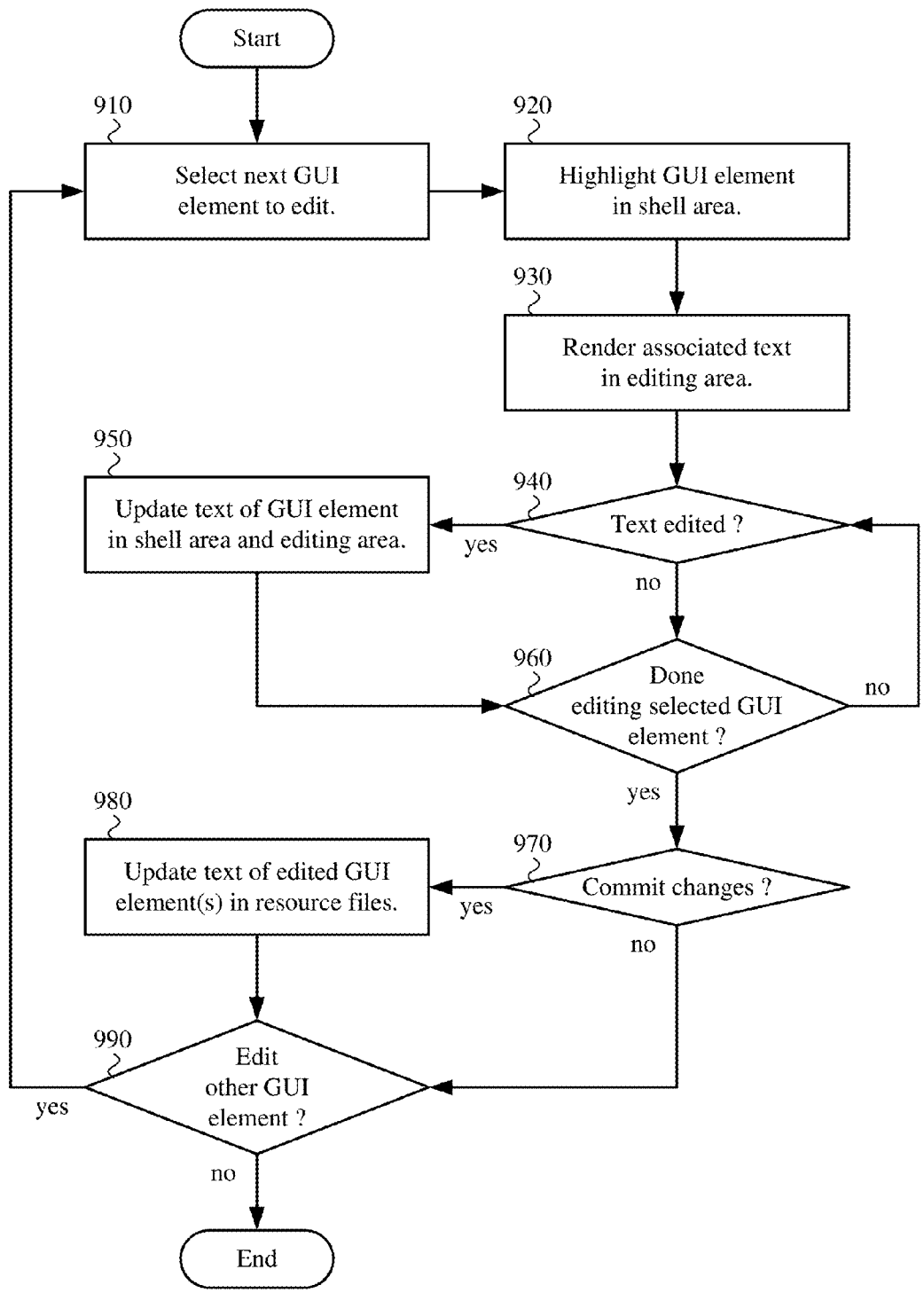
FIG. 9 is a flowchart illustrating an example technique for repeated, in-context editing of text of multiple elements of a GUI.

FIG. 9 illustrates an example technique (900) for repeated, in-context editing of text of multiple elements of a GUI. The technique (900) can be performed by an editing tool such as described with reference to FIG. 6, or by another editing tool.

To start, the editing tool selects (910) a next GUI element to edit. For example, the editing tool selects the next GUI element based on user input selecting that GUI element in a shell area of the editing tool or based on user input in a control area of the editing tool. For the selected GUI element, the editing tool highlights (920) the GUI element in the shell area (e.g., using an overlay) and renders (930) associated text for the selected GUI element in an editing area of the editing tool.

In an input processing loop, the editing tool handles user input to edit the text for the selected GUI element. The editing tool checks (940) if text has been edited for the selected GUI element. If so, the editing tool updates (950) the text of the selected GUI element in the shell area and in the editing area for live editing. Alternatively, the editing tool updates the text of the selected GUI element only in the editing area, deferring updates to the text in the shell area. The editing tool also checks (960) if the user is done editing the selected GUI element, which may be indicated by the user selecting another GUI element in the shell area or control area, or by committing changes made to the selected GUI element. As long as the user is still editing the selected GUI element, the editing tool checks (940) for edits to the text for the selected GUI element.

When the user finishes editing the text for the selected GUI element, the editing tool checks (970) whether to commit the changes made to the text for the selected GUI element. If so, the editing tool updates (980) text of the selected GUI element in the resource files for the selected GUI element. At this time, the editing tool can also update text in resource files for other, previously selected GUI elements for which text changes were not previously committed.

The editing tool checks (990) whether to continue by editing text for another GUI element. If so, the editing tool selects (910) the next GUI element to edit.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A non-transitory computer-readable medium having stored thereon computer-executable instructions for causing a computer system, when programmed thereby, to perform:
   receiving user input specifying a graphical user interface ("GUI");
   determining multiple GUI elements associated with the GUI;
   retrieving code defining the multiple GUI elements, wherein, for at least a portion of the multiple GUI elements, the code defines multiple textual content items to be displayed in association with a respective GUI element;
   rendering a display divided into a first, shell portion, and a second, editing portion, wherein the first and second portions are displayed such that GUI elements of the multiple GUI elements displayed in the first portion do not overlap or obscure, and are not overlapped or obscured by, GUI elements of the multiple GUI elements displayed in the second portion;
   rendering for display the GUI in the first portion of the display, the GUI comprising the multiple GUI elements, based at least in part on the retrieved code, at least a portion of the multiple GUI elements being operable by a user;
   concurrently rendering for display in the second portion of the display a first textual content item and at least a second textual content item associated with at least one GUI element, at least one of the first textual content item and the at least a second textual content item being concurrently displayed in the first portion of the display;
   receiving user input from the user in the second portion of the display for the first textual content item of the at least one GUI element;
   based at least in part on the user input, updating at least some of the text of the first textual content item specified by the at least one GUI element in the displayed GUI; and
   updating the code defining the at least one GUI element with the updated text, wherein the updated text is displayed when the at least one GUI element is rendered in another display.

2. The computer-readable medium of claim 1, wherein selection of the at least one GUI element of the GUI during operation of the GUI in the first portion of the display causes display, in the second portion of the display, of the textual content items specified by code for the at least one GUI element of the GUI.

3. The computer-readable medium of claim 1, wherein switching to the at least one GUI element of the GUI from another element, among the multiple GUI elements of the GUI, causes display, in the second portion of the display, of the textual content items defined by the code for the at least one GUI element of the GUI, the another GUI element being a previous GUI element or next GUI element among the multiple GUI elements of the GUI.

4. The computer-readable medium of claim 1, wherein the multiple textual content items defined by the code for the at least one GUI element of the GUI and displayed in the second portion of the display comprise one or more of a tool tip, a description, and additional explanatory text, and wherein each of the textual content items is editable in a section for that textual content item in the second portion of the display.

5. The computer-readable medium of claim 1, wherein the multiple textual content items defined by the code for the at least one GUI element of the GUI includes multiple textual content items that are concurrently displayed in the second portion of the display, and wherein each of the multiple textual content items is editable in a section for that textual content item in the second portion of the display.

6. The computer-readable medium of claim 1, wherein the second portion of the display comprises:
   a first field that shows a current value of the first textual content item of the at least one GUI element;
   a second field that is editable to provide a new value of the first textual content item; and
   a third field that shows a permissible length for a value of the textual content item.

7. The computer-readable medium of claim 1, wherein the second portion of the display includes a field that shows at least one previous value of the first textual content item of the at least one GUI element.

8. The computer-readable medium of claim 1, wherein the updating of the at least some of the text of the first textual content item comprises updating the second portion of the display and updating the first portion of the display to show the updated text for the at least one GUI element of the GUI.

9. The computer-readable medium device of claim 1, wherein an overlay for the GUI in the first portion of the display highlights any of the multiple GUI elements of the GUI that have new or changed textual content items, and wherein only those GUI elements among the multiple GUI elements of the GUI that have new or changed textual content items are selectable for editing in the second portion of the display.

10. The computer-readable medium of claim 1, wherein any GUI element among the multiple GUI elements of the GUI that has editable textual content items is selectable for editing in the second portion of the display.

11. The computer-readable medium of claim 1, wherein the multiple GUI elements are technical objects related to the GUI, and at least one other technical object related to the GUI that has editable text content is selectable for editing in the second portion of the display, at least a portion of the at least one other technical object related to the GUI not being visible in the GUI.

12. The computer-readable medium of claim 1, wherein at least a portion of the second textual content is not included in the first textual content.

13. The computer-readable medium of claim 1, wherein the computer system is programmed to perform:

emphasizing the at least one GUI element in the first portion of the display area when the at least one GUI element is selected by a user in the second portion of the display area.

14. The computer-readable medium of claim 1, wherein the second portion of the display area displays text for an error message for the at least one GUI element, and wherein the error has not occurred in the first portion of the display.

15. The computer-readable medium of claim 1, wherein the computer system is programmed to instantiate a language editing connector class that implements an interface for retrieving the plurality of GUI elements and an interface for retrieving text for instances of the plurality of GUI elements.

16. The computer-readable medium of claim 1, wherein the computer system is programmed to perform:
   emphasizing the at least one GUI element in the second portion of the display area when the at least one GUI element is selected by a user in the first portion of the display area.

17. A computer system comprising a processor and memory, wherein the computer system comprises computer-executable instructions stored in the memory that implement an editing tool comprising operations for:
   receiving user input specifying a graphical user interface ("GUI");
   determining multiple GUI elements associated with the GUI;
   retrieving code in a computing language specifying the multiple GUI elements including, for at least a portion of the multiple GUI elements, code that defines multiple textual content items to be displayed in association with a respective GUI element;
   the editing tool further comprising:
   a first module comprising computer executable instructions that:
      renders a display divided into a first, shell area, and a second, editing area, wherein the first and second areas are displayed such that GUI elements of the multiple GUI elements displayed in the first area do not overlap or obscure, and are not overlapped or obscured by, GUI elements of the multiple GUI elements displayed in the second area; and
      renders for display the GUI in the first area of the display, the GUI comprising the multiple GUI elements, based at least in part on the retrieved code, at least a portion of the multiple GUI elements being operable by a user; and
   a second module, in communication with the first module, comprising computer-executable instructions that:
      concurrently renders for display in the second area of the display a first textual content item and at least a second textual content item associated with at least one GUI element, at least one of the first textual content item and the at least a second textual content item being concurrently displayed in the first area of the display;
      receives user input from the user in the second area of the display for the first textual content item of the at least one GUI element;
      based at least in part on the user input, updates at least some of the text of the first textual content item specified by the at least one GUI element in the displayed GUI; and
      updates the code defining the at least one GUI element with the updated text, wherein the updated text is displayed when the at least one GUI element is rendered in another display.

18. The computer system of claim 17, wherein the editing tool is configured to signal actions when managing communication between the shell area and the editing area, the actions including:
   a first action that causes, in response to selection of the at least one GUI element in the shell area, loading and displaying the second textual content in the editing area;
   a second action that causes highlighting in the shell area, using an overlay of the GUI, of the at least one GUI element;
   a third action that causes switching, in terms of the second textual content displayed in the editing area or highlighting of the at least one GUI element in the shell area, using an overlay of the GUI, between the at least one GUI element and another GUI element of the multiple GUI elements.

19. The computer system of claim 17, wherein the editing tool further comprises:
   a third module, in communication with one or both of the first module or the second module, configured to simulate error conditions and thereby cause display of error messages in the shell area, at least some of the error messages having associated text that is editable within the editing area.

20. In a computer system, a method comprising:
   receiving resource files specifying a graphical user interface ("GUI");
   determining multiple GUI elements associated with the GUI;
   retrieving at least one resource file specifying the multiple GUI elements, wherein, for at least a portion of the multiple GUI elements, the at least one resource file specifies multiple textual content items to be displayed in association with a respective GUI element;
   rendering a display divided into a first, shell area, and a second, editing area, wherein the first and second area are displayed such that GUI elements of the multiple GUI elements displayed in the first area do not overlap or obscure, and are not overlapped or obscured by, GUI elements of the multiple GUI elements displayed in the second area;
   rendering for display the GUI in the first area of the display, the GUI comprising the multiple GUI elements, based at least in part on the retrieved at least one resource file, at least a portion of the multiple GUI elements being operable by a user;
   concurrently rendering for display in the second area of the display a first textual content item and at least a second textual content item associated with at least one GUI element, at least one of the first textual content item and the at least a second textual content item being concurrently displayed in the first area of the display;
   receiving user input from the user in the second area of the display for the first textual content item of the at least one GUI element;
   based at least in part on the user input, updating at least some of the text of the first textual content item specified by the at least one GUI element in the displayed GUI; and
   updating the at least one resource file specifying the at least one GUI element with the updated text, wherein the updated text is displayed when the at least one GUI element is rendered in another display.

* * * * *